(12) United States Patent
Thekadath et al.

(10) Patent No.: US 11,429,592 B2
(45) Date of Patent: Aug. 30, 2022

(54) SYSTEMS AND METHODS FOR RECORDING DATA REPRESENTING MULTIPLE INTERACTIONS

(71) Applicant: Visa International Service Association, San Francisco, CA (US)

(72) Inventors: Ajith Thekadath, San Ramon, CA (US); Suman Mukherjee, Foster City, CA (US); Mondo Jacobs, Dublin, CA (US); David Henstock, San Francisco, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 379 days.

(21) Appl. No.: 16/604,950

(22) PCT Filed: Apr. 13, 2018

(86) PCT No.: PCT/US2018/027455
§ 371 (c)(1),
(2) Date: Oct. 11, 2019

(87) PCT Pub. No.: WO2018/200215
PCT Pub. Date: Nov. 1, 2018

(65) Prior Publication Data
US 2020/0379979 A1    Dec. 3, 2020

Related U.S. Application Data

(60) Provisional application No. 62/490,502, filed on Apr. 26, 2017.

(51) Int. Cl.
*G06F 16/23*    (2019.01)
*H04L 9/30*     (2006.01)
*H04L 9/32*     (2006.01)

(52) U.S. Cl.
CPC .......... *G06F 16/2379* (2019.01); *H04L 9/30* (2013.01); *H04L 9/3247* (2013.01); *H04L 2209/38* (2013.01)

(58) Field of Classification Search
None
See application file for complete search history.

(56) References Cited

U.S. PATENT DOCUMENTS

2008/0046443 A1\* 2/2008 Fachan ............... G06F 12/0804
2008/0144637 A1\* 6/2008 Sylvain ............... H04L 65/1056
                                                            370/401
(Continued)

FOREIGN PATENT DOCUMENTS

CN    105761143    7/2016
CN    106230852    12/2016
(Continued)

OTHER PUBLICATIONS

R. L. Rivest et al, "A Method for Obtaining Digital Signatures and Public Key Cryptosystems" ACM 0001-0782/78/0200-0120, 1978 7 pages.\*

(Continued)

*Primary Examiner* — Uyen T Le
(74) *Attorney, Agent, or Firm* — Kilpatrick Townsend & Stockton LLP

(57) ABSTRACT

A method for combining multiple interactions into a single record entry is disclosed. A data package can be created that represents a set of interactions, and each entity associated with an interaction can review the data package. Each entity can indicate agreement with the interactions by digitally signing the data package. Once signed by each involved entity, the data package can be stored in a record such as a blockchain.

20 Claims, 9 Drawing Sheets

(56) References Cited

U.S. PATENT DOCUMENTS

| | | | |
|---|---|---|---|
| 2013/0197939 A1 | 8/2013 | Shah | |
| 2015/0121081 A1* | 4/2015 | Dayka | H04L 9/3247 |
| | | | 713/176 |
| 2016/0028552 A1 | 1/2016 | Spanos | |
| 2016/0099920 A1* | 4/2016 | Meuleman | H04L 63/18 |
| | | | 713/153 |
| 2016/0275461 A1 | 9/2016 | Sprague | |
| 2016/0283920 A1 | 9/2016 | Fisher et al. | |
| 2016/0342989 A1 | 11/2016 | Davis | |
| 2017/0046364 A1 | 2/2017 | Gajendran | |
| 2017/0046651 A1 | 2/2017 | Lin | |
| 2017/0059744 A1 | 3/2017 | Lundy | |
| 2017/0091397 A1 | 3/2017 | Shah | |
| 2017/0250972 A1* | 8/2017 | Ronda | H04L 9/3236 |
| 2017/0323294 A1 | 11/2017 | Rohlfing et al. | |

FOREIGN PATENT DOCUMENTS

| | | |
|---|---|---|
| CN | 106296138 | 1/2017 |
| CN | 106452785 | 2/2017 |
| EP | 3073670 | 9/2016 |
| GB | 201617872 | 10/2016 |
| WO | 2016161073 | 10/2016 |
| WO | 2017004527 | 1/2017 |
| WO | 2018085558 | 5/2018 |

OTHER PUBLICATIONS

Ralph C. Merkle, "Protocols for Public Key Cryptosystems" IEEE CH1522-2C/80/0000-0122, 1980 13 pages.*

Application No. EP18789851.5, Office Action, dated Jun. 11, 2021, 4 pages.

International Search Report and Written Opinion, PCT/US2018/027455, dated Aug. 1, 2018, 12 pages.

EP18789851.5, "Extended European Search Report", dated Mar. 3, 2020, 8 pages.

Application No. CN201880027081.0, Office Action, dated Dec. 22, 2021, 18 pages.

Application No. CN201880027081.0, Notice of Decision to Grant, dated Apr. 19, 2022, 6 pages.

AU2018257949, "First Examination Report", dated Apr. 28, 2022, 3 pages.

* cited by examiner

SYSTEMS AND METHODS FOR RECORDING DATA REPRESENTING MULTIPLE INTERACTIONS

CROSS REFERENCE TO RELATED APPLICATIONS

This application is a 35 U.S.C. 371 patent application which claims priority to PCT Application No. PCT/US2018/027455, with an international filing date of Apr. 13, 2018, which is a non-provisional application of and claims the benefit of the filing date of U.S. Provisional Application No. 62/490,502, filed on Apr. 26, 2017, which are herein incorporated by reference in its entirety for all purposes.

BACKGROUND

Blockchain networks are designed so that multiple endpoint computers within the network can submit new information. When a computer submits new information to a blockchain, the information becomes immutably stored. This manner of storing information is useful for a number of scenarios.

For example, roommates can decide how to divide up their cleaning chores. The first roommate may promise to sweep the floor. The second roommate may promise to take out the trash. In order to solidify the agreement, both roommates can record their promises on the blockchain. As a result, if either roommate disputes what the other promised, they can resolve the dispute by referring to blockchain records.

However, blockchain technology is not currently suited for recording all types of information. For example, in some situations, multiple actors work in sequence or otherwise contribute in order to complete a single project. However, in typical blockchain technology, each actor has a separate private key, meaning that each actor can only make promises related to their own actions, not the actions of others. Thus, the blockchain can only store each individual's promise to complete a part of a project, and as a result there is no simple way to record that the entire project will be finished.

As an example, a house construction project is often divided into multiple stages that are completed by different actors. A ground worker may prepare the foundation, a plumber may install water pipes, an electrician may install wires, a roofer may build the roof, etc. At best, each of these actors can enter into a blockchain their own promise to complete their own task. This results in a number of different blockchain entries related to the house construction project that are disconnected and difficult to track. As a result, it is difficult to verify that each separate task will be finished, and that the total house will be finished.

Embodiments of the invention address these and other problems individually and collectively.

SUMMARY

Embodiments of the invention provide systems and methods for consolidating multiple record entries into one entry, as well as allowing multiple parties to contribute to a single record.

A first node computer can create a data package which defines multiple interactions, each interaction being associated with a different entity. For example, a data package can indicate a first interaction associated with the first node computer, a second interaction associated with a second node computer, a third interaction associated with a third node computer, and so forth. The data package can include several separate interactions that, when all performed, result in a single complete project.

Embodiments allow each node computer to receive, analyze, and approve of the data package individually. Each node computer can generate a digital signature for the data package using their unique private key. In some embodiments, digitally signing a data package can be indicative of a node computer's agreement to the information in the data package. Thus, a digital signature can serve as proof that a node computer commits to performing one or more actions as indicated in the data package.

Once each node computer associated with the data package has approved of and digitally signed the data package, the data package and the generated digital signatures can be added to a blockchain record.

One embodiment of the invention is directed to a method. The method comprises receiving, by an administrative node computer, data representing a plurality of interactions from a first node computer. The plurality of interactions include a first interaction associated with the first node computer and a second interaction associated with the administrative node computer. The method also includes receiving a first digital signature associated with the data representing the plurality of interactions. The first digital signature is generated with a first private key associated with the first node computer. Additionally, the first digital signature indicates the first node computer's agreement with the first interaction. The method further comprises generating a second digital signature with a second private key associated with the administrative node computer. The second digital signature indicates the administrative node computer's agreement with the second interaction. The method also includes creating a block for a blockchain, the block including the data representing the plurality of interactions.

Another embodiment of the invention is directed to an administrative node computer configured to perform the above-described method.

Another embodiment of the invention is directed to a method comprising generating, by a first node computer, data representing a plurality of interactions. The plurality of interactions include a first interaction associated with the first node computer and a second interaction associated with the administrative node computer. The method also includes generating a first digital signature with a first private key. The first digital signature is associated with the data representing the plurality of interactions. Additionally, the first digital signature indicates the first node computer's agreement with the first interaction. The method further comprises transmitting the data representing a plurality of interactions and the first digital signature to an administrative node computer. The administrative node computer then generates a second digital signature with a second private key, and the second digital signature indicates the administrative node computer's agreement with the second interaction. The administrative node computer also creates a block for a blockchain, the block including the data representing the plurality of interactions.

Another embodiment of the invention is directed to a first node computer configured to perform the above-described method.

Further details regarding embodiments of the invention can be found in the Detailed Description and the Figures.

DETAILED DESCRIPTION

Figure 1:
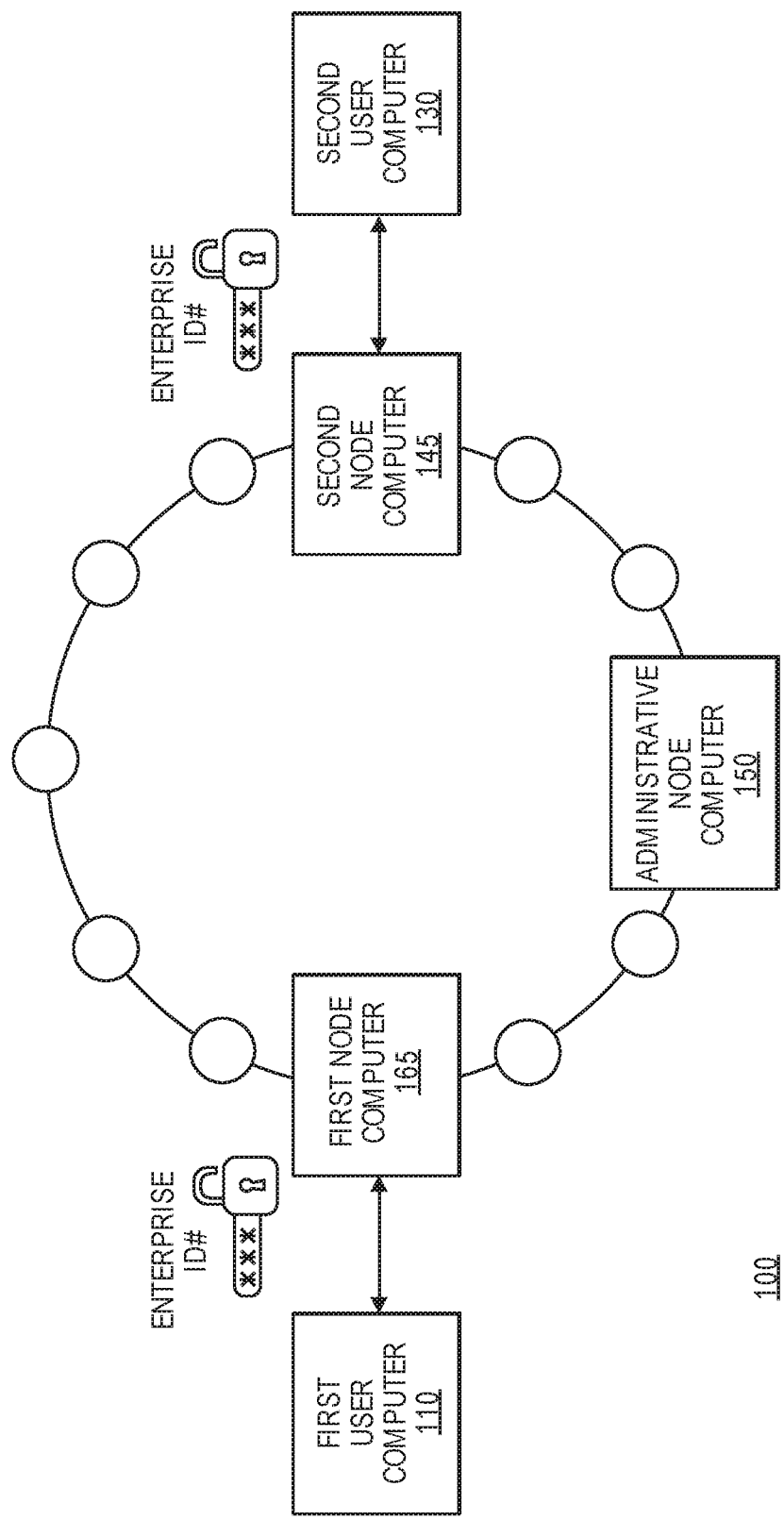
FIG. 1 shows a block diagram of a system according to an embodiment of the invention.

Embodiments of the present invention provide systems and methods for recording multiple interactions together at the same time, and for allowing multiple parties to contribute to a single record. A first node computer (e.g., or other record-submitting entity) can generate a data package that includes information about a plurality of interactions. Then, the first node computer can transmit the data package to each party (e.g., an administrative node) that is responsible for one of the interactions. Each responsible party can then generate a digital signature for the data package, their digital signature indicating their assurance that any interactions for which they are responsible will be completed. Once each responsible party has approved of and digitally signed the data package, the data package and digital signatures can be added to a blockchain record.

As a result, several interactions can be recorded together instead being submitted and recorded separately. This improves record-keeping efficiency and reduces record-processing bandwidth, as one record is validated and entered where there may have been several records before. Additionally, the data package may include information about interactions that are related to one another, such as different transfer steps within a payment transaction, or separate tasks that contribute to a construction project. As a result, a single data package can be used to record multiple parts of a larger project. This means that a record system can be better organized and allow for an entire project to be identified by locating a single record entry.

Additionally, in some embodiments, a data package may not be recorded (e.g., in a blockchain record) until all responsible parties have approved and digitally signed. This means that one responsible actor may not have to irreversibly-commit to an action until every other actor also commits to their actions. For example, if a first actor digitally signs a data package (e.g., indicating a pending commitment) but a second actor refuses to sign, the data package can be deleted instead of recorded, such that the first actor is released from their pending commitment. Similarly, a project plan may not be finalized until every actor has committed to doing their part. Thus, a first draft of a plan may be agreed to by some actors but not all. The plan may be iteratively revised, and may not be finalized and permanently recorded until each actor has agreed (e.g., via a digital signature) to the details laid out in the data package. Thus, embodiments of the invention assist in creating interaction records and plans by allowing various actors to tentatively commit at first, and then permanently commit once all the actors agree.

Additional features that can be included in embodiments of the invention are described in the International Application US2017/046364 and in International Application US2017/059744, both of which are incorporated by reference herein in their entirety for all purposes.

Prior to discussing specific embodiments of the invention, some terms may be described in detail.

An "interaction" may include an activity, exchange, or communication. Example interactions include performing a task (e.g., installing a pipe), a value transfer (e.g., a payment transaction or a transfer of access privileges), and providing updated information (e.g., medical records, academic records, etc.).

A "value" may include an amount, an asset, or a set of information with worth. For example, a value can include an amount of currency, access rights, or login credentials. A value can change ownership by being transferred from a first owner to a second owner. Examples of value transfers include payment transactions where currency is transferred, credit transfers such as where game credits or mobile phone minutes are transferred, and property transfers where event tickets or property deeds are transferred.

A "data package" may refer to a collection of digital information. For example, a data package can be information that exists in binary format. In some embodiments, a data package can include information about anything that can be described in a record, such as an interaction. For example, a data package can include any suitable type of digital information, such as activity data, ownership data, product status data, project update data, etc. Embodiments allow a data package to include data that represents a plurality of interactions. For example, a data package can include digital information about multiple interactions, such as two or more payment transactions, or two or more construction activities.

The term "node" may refer to a connection point. In some embodiments, a node may be a physical electronic device that is capable of creating, receiving, or transmitting data. In other embodiments, a node may be a software module on a computing device, the software module a connection point in a communication network. In some embodiments, a node may be a computing device within a record-keeping network. A node may be able to create a data package, transfer a data package, receive a data package, validate a data package, access a central record, and/or perform any other suitable functions. Different types of nodes may be able to perform different sets of functions within a recording network. In some embodiments, a node may be associated with and/or operated by a financial institution computer (e.g., a bank), a payment processor computer, a third party computer, or any other suitable entity.

A "record" may refer to evidence of one or more interactions. A digital record can be electronic documentation of an interaction. A record can include a record identifier and record information. For example, record information can include information describing one or more interactions and/or information associated with the interactions (e.g., a digital signature). Record information can also include multiple data packets each of which include different data describing a different plurality of interactions. A record identifier can be a number, title, or other data value used for identifying a record. A record identifier can be nondescript, in that it may not provide any meaningful information about the record information in the record. Examples of records include medical records, academic records, transaction records within a ledger of transactions, etc. Another example of a record is a block in a blockchain. An individual block can be an individual record, and a blockchain can be a series of records. A blockchain header is an example of a record identifier, and a blockchain body is an example of record information.

The term "ledger of transactions" may refer to a compilation of data from previous transactions. The ledger of transactions may be a database or other comparable file structure that may be configured to store data from all previous transactions, including the date and time of the transaction, the transaction amount, and identification information for the participants of the transaction (e.g., the sender and the receiver of the transaction amount). In some embodiments, the ledger of transactions may be in the form of an electronic ledger (e.g., blockchain) in which data already stored in the electronic ledger is unalterable.

A "blockchain" can be a database that maintains a continuously-growing list of records secured from tampering and revision. A blockchain may include a number of blocks of interaction records recorded on one or more nodes. Each block in the blockchain can contain also include a timestamp and a link to a previous block. For example, each block may include or be appended to a hash of the previous block. Stated differently, interaction records in a blockchain may be stored as a series of "blocks," or permanent files that include a record of a number of transactions occurring over a given period of time. Blocks may be appended to a blockchain by an appropriate node after it completes the block and the block is validated. In embodiments of the invention, a blockchain may be distributed, and a copy of the blockchain may be maintained at each node in a blockchain network.

A "key pair" may include a pair of linked encryption keys. For example, a key pair can include a public key and a corresponding private key. In a key pair, a first key (e.g., a public key) may be used to encrypt a message, while a second key (e.g., a private key) may be used to decrypt the encrypted message. Additionally, a public key may be able to verify a digital signature created with the corresponding private key. The public key may be distributed throughout a network in order to allow for verification of messages signed using the corresponding private key. Public and private keys may be in any suitable format, including those based on RSA or elliptic curve cryptography (ECC). In some embodiments, a key pair may be generated using an asymmetric key pair algorithm. However, a key pair may also be generated using other means, as one of ordinary skill in the art would understand.

The term "digital signature" may refer to an electronic signature for a message. A digital signature may be a numeric data value, an alphanumeric data value, or any other type of data including a graphical representation. A digital signature may be a unique data value generated from a message and a private key using an encrypting algorithm. In some embodiments, a validation algorithm using a public key may be used to verify the signature.

An "enterprise identifier" may include an identifier for a user. For example, an enterprise identifier can be a globally unique identifier for an end user that submits new record information to a node in a record-keeping network, or for an end user that receives information about new record information (e.g., a value transfer) from a node. In some embodiments, an enterprise identifier can also indicate a specific node with which a user is associated. An enterprise identifier may include alphanumeric characters, special characters, and any other suitable symbol.

An "address identifier" may include an identifier for a participant. For example, an address identifier can represent a node or a service provider in a network. In some embodiments, a communication can be directed to a specific node by including the node's address identifier. An address identifier can include a string of characters, such as letters, numbers, etc. For example, an address identifier can be a string of 5, 10, 15, or any other suitable number of characters. In some embodiments, a public key associated with a participant can be used as the participant's address identifier.

A "class identifier" may include a data value that represents a specific type of record. Class identifiers can be used to identify any suitable class of recordable information. For example, a class identifier can be configured to identify medical information-type records, academic credential-type records, product identifier-type records, employee data-type records, activity-type records (e.g., construction activities, plumbing activities, etc.), value transfer records of various types (e.g., US dollar payments, British pound payments, Chinese yuan payments, digital rights data transfers, property deed transfers, event ticket transfers, game credit transfers, energy credit transfers, mobile phone minute transfers, etc.), or any other suitable type of record. Classes can be divided in any suitable manner. In some embodiments, a class identifier can also indicate that a specific participant is authorized to create and/or receive data packages for that type of record. A class identifier can include a string of characters, such as letters, numbers, etc. For example, an address identifier can be a string of 5, 10, 15, or any other suitable number of characters.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers.

FIG. 1 shows a system 100 comprising a number of components. The system 100 comprises a recording network that is administered by an administrative node computer 150. The first node computer 165, the second node computer 145, and any other suitable number of node computers participate in the network. The first user computer 110 operated by a first user (not shown) can submit record update instructions via the first node computer 165, and the second user computer 130 operated by a second user (not shown) can receive record updates via the second node computer 145. All of the computers shown in the system 100 may be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Messages between the computers, networks, and devices may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

The system 100 can be configured to create and maintain records of any suitable types. The administrative node computer 150 can administrate the record-keeping process by providing a number services. For example, the administrative node computer 150 can build new blocks for a blockchain, the new blocks including updated record information. The administrative node computer 150 can also enroll nodes and end users, as well as regulate the behavior of participating nodes in order to keep the records secure and reliable. The administrative node computer 150 can further verify new data packages and inform participating nodes about new interactions and blocks.

While the administrative node computer 150 can build and maintain the records, the first node computer 165 and the second node computer 145 can submit new information to the administrative node computer 150 for recording. The first node computer 165 and the second node computer 145 can do this by creating and submitting data packages with interactions of various classes. The first node computer 165 and the second node computer 145 can create data packages based on interaction instructions received from the first user computer 110 and/or the second user computer 130.

While FIG. 1 specifically illustrates the first node computer 165 and the second node computer 145, the system 100 can include any suitable number of additional node computers (as represented by the empty circles in FIG. 1).

Additionally, the first node computer 165 and second node computer 145 can communicate with other user computers beyond the first user computer 110 and the second user computer 130. Further, the system 100 can include more than one administrative node computer 150 for administering the recording network.

The system 100 may be used to process, approve, and record any suitable type of information. For example, the system 100 can be used to record information about new interactions, such as new projects and activities, new value transfers, new medical patient data, new academic achievements, etc.

Further, the system can combine multiple interactions into a single data package and then a single blockchain record. For example, instead of submitting different data packages for different interactions, the first node computer 165 can submit a single data package including information about multiple interactions. As explained below, multiple nodes can provide their digital signatures to indicate approval of such a data package, and the data package may not be accepted into the record until each associated node provides their digital signature.

Figure 2:
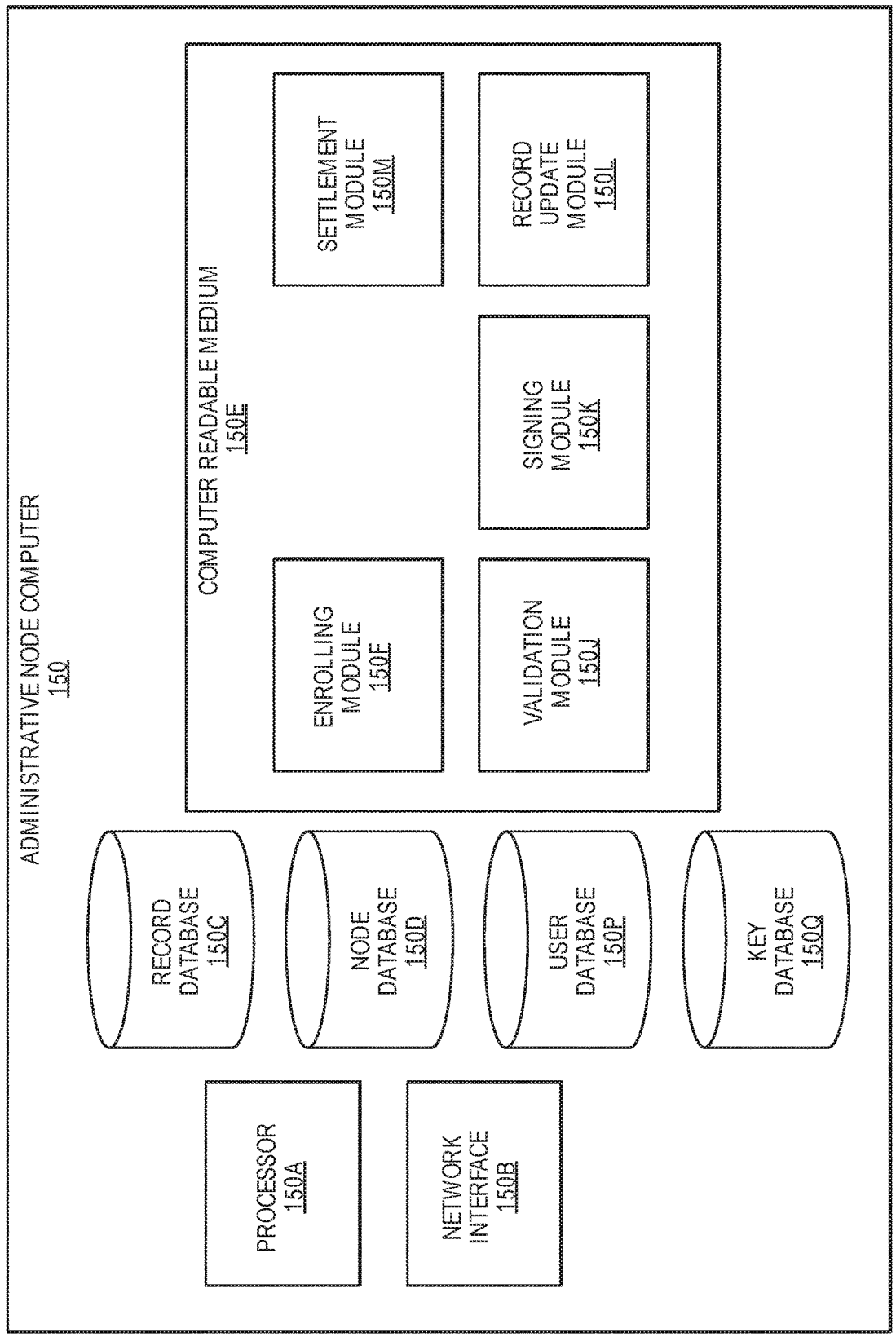
FIG. 2 shows a block diagram of an administrative node computer, according to an embodiment of the invention.

An example of an administrative node computer 150, according to some embodiments of the invention, is shown in FIG. 2. The administrative node computer 150 comprises a processor 150A, a network interface 150B, a record database 150C, a node database 150D, a user database 150P, a key database 150Q, and a computer readable medium 150E.

The record database 150C can store records. For example, interaction data received from nodes in the network can be inserted into a record and stored in the record database 150C. In some embodiments, the records can take the form of a blockchain with block records, each block including one or more data packages representing one or more interactions.

The node database 150D can include information about nodes, such as the first node computer 165 and the second node computer 145. For example, the node database can include identifiers associated with the first node computer 165, such as an address identifier and one or more class identifiers. The node database 150D can also include information about restrictions, such as spending limits, associated with different nodes.

The user database 150P can include information about enrolled end users, such as the first user and the second user, as well as devices associated with the users (e.g., the first user computer 110 and the second user computer 130). This can include enterprise identifiers, as well as information about with which node the user is associated. For example, the second user computer's enterprise identifier can be associated with the second node computer's address identifier as well as a specific class identifier.

The key database 150Q can store encryption keys. For example, the key database 150Q can include a public key for each node, as well as a private key associated with the administrative node computer 150. In some embodiments the key database 150Q can take the form of a hardware security module (HSM).

The computer readable medium 150E may comprise an enrolling module 150F, validation module 150J, a signing module 150K, a record update module 150L, a settlement module 150M, and any other suitable software module. The computer readable medium 150E may also comprise code, executable by the processor 150A for implementing a method comprising receiving data representing a plurality of interactions from a first node computer, the plurality of interactions including a first interaction associated with the first node computer and a second interaction associated with the administrative node computer; receiving a first digital signature associated with the data representing the plurality of interactions, the first digital signature being generated with a first private key associated with the first node computer, and the first digital signature indicating the first node computer's agreement with the first interaction; generating a second digital signature with a second private key associated with the administrative node computer, the second digital signature indicating the administrative node computer's agreement with the second interaction; and creating a block for a blockchain, the block including the data representing the plurality of interactions.

The enrolling module 150F may comprise code that causes the processor 150A to enroll node computers for joining the recording network. For example, the enrolling module 150F may contain logic that causes the processor 150A to evaluate whether or not an entity can enroll, as well as what level of risk to assign to a new entity. A risk level can be affected by whether the entity is a well-known and reliable organization, whether it has established a settlement account or other settlement processes, whether it is located in a risky country, etc. In addition to assigning a risk level, the administrative node computer 150 can issue activity limits for the node based on the risk profile. Activity limits can include, for example, maximum transaction threshold limits and/or velocity limits, such as a limit on the number of payment transactions or total transaction value that can be submitted within a certain time period (e.g., a day, a week, or a month).

The enrolling module 150F may also include instructions for generating and assigning a unique address identifier for a newly enrolled node. Additionally, there may be instructions for generating and distributing keys to a newly enrolled node. For example, the administrative node computer 150 may generate a key pair for a node. The administrative node computer 150 can store the public key and provide the private key to the node computer.

The enrolling module 150F can further include instructions for enrolling end users. For example, the administrative node computer 150 can receive information about a new user (e.g., a name, address, account number, phone number, a business' corporate profile, etc.) from a node, store the user information, and then assign a unique enterprise identifier to the user. In some embodiments, the enterprise identifier can include a subset of characters that are indicative of the associated node or the node's address identifier.

The validation module 150J may comprise code that causes the processor 150A to validate a new data package so that the data package can be entered in the records. For example, the validation module 150J may contain logic that causes the processor 150A to check that a data package includes an address identifier and a class identifier are both valid and associated with the same node computer, and to check that limits associated with the submitted class identifier have not been exceeded and are not currently being exceeded by the new data package.

The validation module 150J may further contain logic that causes the processor 150A to verify that all entities associated with the data package (e.g., one or more nodes, and one or more users) are registered with the network and have been screened for compliance. The administrative node computer 150 can also evaluate transaction risk, for example by assessing the transaction velocity of one or more parties involved, or by determining whether the submitting node has any warnings issued.

The validation module 150J may further comprise code that causes the processor 150A to verify the authenticity of one or more digital signatures. For example, the validation module 150J may contain logic that causes the processor 150A to use a node computer's public key to verify the authenticity of a digital signature associated with that node computer.

The signing module 150K may comprise code that causes the processor 150A to generate digital signatures. For example, the signing module 150K may contain logic that causes the processor 150A to generate a digital signature for a data package using an administrative node private key. The administrative node computer's digital signature can serve to indicate the authenticity of a data package, and can provide a guarantee that a transfer is valid and trustworthy.

In some embodiments, the data package can include information about more than one interaction, and the administrative node computer's digital signature can indicate that the administrative node computer 150 has committed to completing any interactions shown to be the administrative node computer's responsibility. For example, the data package may describe two transactions, the first transaction including a first payment by first node computer 165 (e.g., to the administrative node computer 150), and the second transaction including a second payment by the administrative node computer 150 (e.g., to the second node computer 145). Thus, the administrative node computer's digital signature can demonstrate that the administrative node computer 150 will complete the second transaction and deliver a promised value to the recipient, even if the payor (e.g., the first node computer 165) does not complete the first payment.

Additionally, each digital signature can activate a smart contract. For example, a first smart contract may hold the first node computer 165 liable for the first transaction, and a second smart contract may hold the administrative node computer 150 liable for the second transaction. Smart contracts can automatically initiate a settlement process after a certain amount of time. In some embodiments, the administrative node computer 150 can force settlement between two accounts at a central bank.

The record update module 150L may comprise code that causes the processor 150A to maintain and update a set of records. For example, the record update module 150L may contain logic that causes the processor 150A to record information about a new interaction (e.g., as indicated in a new data package). In some embodiments, the record update module 150L may include instructions for including a new data package with data representing a plurality of interactions (e.g., and associated digital signatures) in the next blockchain block.

The record update module 150L may further include instructions for, when a new data package is created, informing the parties associated with the interactions described in the data package. For example, when a new payment transaction is validated and signed, the administrative node computer 150 may send information about the new payment transaction to a receiving node (e.g., the second node computer 145) and/or the user computers.

In some embodiments, the participating node computers may not maintain a separate set of records, and may instead refer to the centrally-maintained records of the administrative node computer 150. For example, the first node computer 165 and the second node computer 145 may each be light nodes. In such a case, the administrative node computer 150 may provide these nodes with real-time access to the central records, or the administrative node computer 150 may provide regular record updates (e.g., updates can be sent every 10 seconds, 1 minute, 5 minutes, etc.). As a result, other nodes may be aware of new interactions immediately or soon after the interactions are recorded.

In some embodiments, participating node computers may not be able to see all of the record information, and they may instead have a filtered or permissioned view of the records. For example, the first node computer 165, the second node computer 145, the first user computer 110, and/or the second user computer 130 may only be able to view interaction records with which they are associated (e.g., transactions to which they are a party) when accessing the records at the administrative node computer 150. For example, the second node computer 145 may be able to view all block headers, but may only be able to view block bodies and interaction records with which it is associated.

In some embodiments, there may be multiple administrative node computers 150 that each receive and process different data packages with information about different interactions, and then update their own records. These different administrative node computers may communicate with one another to share new records and to confirm that their records include the same interactions.

The settlement module 150M may comprise code that causes the processor 150A to settle a promised value between accounts. For example, the settlement module 150M may contain logic that causes the processor 150A to debit the first node's settlement account at a central bank by an amount indicated in an interaction record, and to credit the second node's settlement account with that same amount (or that amount less assessed fees).

In some embodiments, settlement can take place in multiple steps (e.g., as a result of transferring a value using multiple transactions). For example, a first settlement can include debiting the first node's settlement account by a first amount indicated in a first interaction record, and crediting an administrative node settlement account with that same first amount. Then, a second settlement can include debiting the administrative node settlement account by a second amount indicated in a second interaction record, and then crediting the second node's settlement account with that same second amount. As a result, a value is transferred from the first node to the second node via the administrative node.

In some embodiments, the second amount may be less than the first amount (e.g., as the result of transfer fees or exchange rates). Additionally, the second amount may be settled using a different type of currency than the first amount (e.g., the first transaction can be settled between US Dollar accounts, and the second transaction can be settled using Chinese yuan). Additional settlement details are described below, with respect to FIGS. 5-6.

Referring back to FIG. 1, the first node computer 165 can, as mentioned above, participate in the recording network by creating and submitting new data packages with new interaction data in order to update the records on behalf of one or more users.

Figure 3:
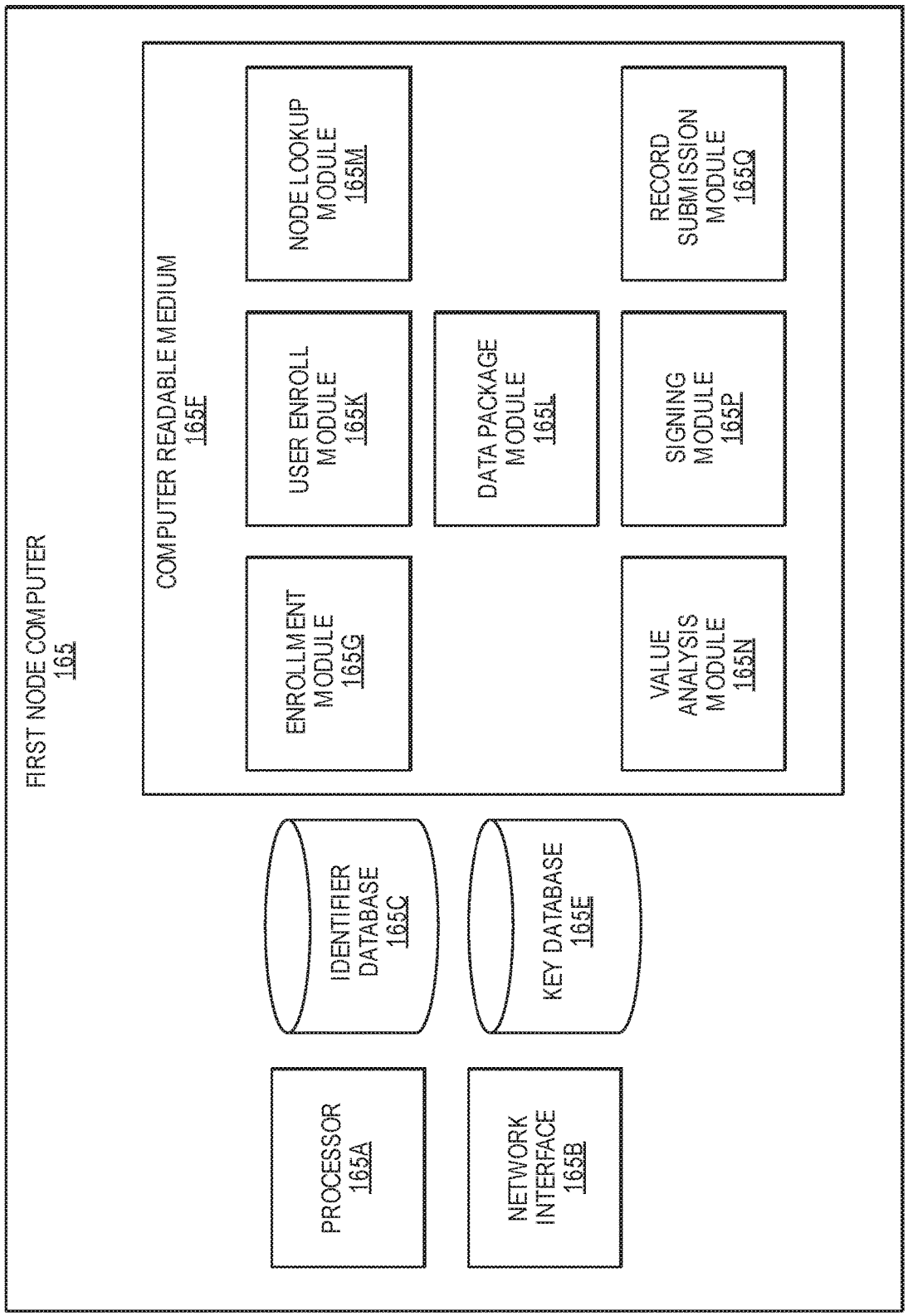
FIG. 3 shows a block diagram of a first node computer, according to an embodiment of the invention.

An example of a first node computer 165, according to some embodiments of the invention, is shown in FIG. 3. The first node computer 165 comprises a processor 165A, a network interface 165B, an identifier database 165C, a key database 165E, and a computer readable medium 165F.

The identifier database 165C can store information about the first node computer's identifiers, such as an address identifier and one or more class identifiers. The identifier database 165C may also include information about one or more users, such as an enterprise identifiers, an associated class type, and/or a user account.

The key database 165E can store encryption keys. For example, the key database 165E can include a private key associated with the first node computer 165, as well as a public key associated with the administrative node computer 150.

In some embodiments the key database 165E can take the form of a hardware security module (HSM).

The computer readable medium 165F may comprise an enrollment module 165G, a user enroll module 165K, a data package module 165L, a node lookup module 165M, a value analysis module 165N, a signing module 165P, a record submission module 165Q, and any other suitable software module. The computer readable medium 165F may also comprise code, executable by the processor 165A for implementing a method comprising generating data representing a plurality of interactions, the plurality of interactions including a first interaction associated with the first node computer and a second interaction associated with the administrative node computer; generating, with a first private key, a first digital signature associated with the data representing the plurality of interactions, the first digital signature indicating the first node computer's agreement with the first interaction; and transmitting the data representing a plurality of interactions and the first digital signature to an administrative node computer, wherein the administrative node computer generates a second digital signature with a second private key, the second digital signature indicating the administrative node computer's agreement with the second interaction, and wherein the administrative node computer creates a block for a blockchain, the block including the data representing the plurality of interactions.

The enrollment module 165G may comprise code that causes the processor 165A to enroll with the administrative node computer 150 for participation in the recording network. For example, the enrollment module 165G may contain logic that causes the processor 165A to send an enrollment request message including information about the first node, such as an address, a bank identifier, a settlement account, and/or any other suitable information. The enrollment module 165G also include instructions for receiving and storing an address identifier, an administrative node public key, a first node private key, one or more class identifiers, and any other suitable enrollment information from the administrative node computer 150.

The user enroll module 165K may comprise code that causes the processor 165A to facilitate enrollment of end users. For example, the user enroll module 165K may contain logic that causes the processor 165A to provide user information (e.g., a name, a residential and/or business address, a date of birth, a phone number, an account number, an account username, an account password, an email address, a government-issued identification number such as a driver's license number, passport number, or social security number, etc.) to the administrative node computer 150. The first node computer 165 can also receive and store an enterprise identifier for the first user computer 110 from the administrative node computer 150, and provide the enterprise identifier to the first user computer 110.

The data package module 165L may comprise code that causes the processor 165A to generate a new data package. For example, the data package module 165L may contain logic that causes the processor 165A to receive an instruction from the first user computer 110, and to create a data package for one or more interactions based on the instruction. The data package can include any suitable information for entering a new record into a ledger. In the example of payment transactions, the data package can include information about the sending account, the receiving account, the sending currency, the receiving currency, and/or any other suitable information.

In some embodiments, the data package can be created to include information that details multiple transactions. For example, the data package can describe a first transaction (e.g., first sender, first receiver, first currency type, first amount, etc.), as well as a second transaction (e.g., second sender, second receiver, second currency type, second amount, etc.). Accordingly, the first node computer 165 can generate a data package that describes multiple steps for transferring a value to a recipient. As explained below, each party involved with the transfer can agree to the details in the data package by providing a digital signature.

The node lookup module 165M may comprise code that causes the processor 165A to identify a node based on a user. For example, the node lookup module 165M may contain logic that causes the processor 165A to identify the second node computer based on the second user computer being indicated as a transaction recipient. For example, the second node's address identifier may be identified based on a subset of characters included in the second user's enterprise identifier, or the address identifier can be associated with the second user's enterprise identifier in a database (e.g., a database accessed at the administrative node computer 150). The node lookup module 165M can also include instructions for adding an identified address identifier to a new data package.

The value analysis module 165N may comprise code that causes the processor 165A to determine a value for an interaction. For example, the value analysis module 165N may contain logic that causes the processor 165A to determine a first amount in a first currency that will be charged to the first user computer 110 in order to deliver a second amount in a second currency to the second user computer 130. This determination can include looking up a current foreign exchange rate and calculating transfer fees (e.g., both of which can be provided by the administrative node computer 150). The amount debited in the first currency, the amount credited in the second currency, the currency exchange rate, and/or the fees assessed can be included in a new data package.

The signing module 165P may comprise code that causes the processor 165A to create a digital signature. For example, the signing module 165P may contain logic that causes the processor 165A to apply a private key and a mathematical algorithm to a data package, such that the digital signature is generated for the data package. The first node computer's digital signature can serve as evidence that it truly was the first node computer 165 that created and submitted the data package. The first node computer's digital signature can also indicate the first node computer's commitment to one or more interactions specified in the data package. For example, by signing the data package, the first node computer 165 may be committing to completing a first payment transaction where a first value is transferred from the first node to the administrative node.

The record submission module 165Q may comprise code that causes the processor 165A to submit a new data package with new interactions for recording. For example, the record submission module 165Q may contain logic that causes the processor 165A to send a new data package, an associated digital signature, and/or any other suitable information to the administrative node computer 150.

In some embodiments, the first node computer 165 can provide additional services to a user beyond submitting new data packages with new interactions to the recording network. For example, the first node computer 165 can be a computer associated with a financial institution, a hospital, a government agency, an academic institution, a mobile phone service provider, or any other suitable service provider. Accordingly, in some embodiments, the first node computer 165 can maintain an account on behalf of the user. The account may store identity information, medical records, academic records, financial information, or any other suitable details depending on the type of service provider.

In embodiments where the first node computer 165 is associated with a financial institution, the first node computer 165 may store value on behalf of the user. The first node computer 165 may also be able to provide value (e.g., provide a payment) on behalf of the user. An example of a financial institution is an issuer, which may typically refer to a business entity (e.g., a bank) that issues and maintains an account (e.g., a bank account) for a user.

In some embodiments, the first node computer 165 can be representative of multiple associated computers. For example, the functionality described above for network participation and the functionality associated with banking services can be divided among several cooperative computers.

Referring back to FIG. 1, the second node computer 145 can, as mentioned above, participate in the recording network. In some embodiments, the second node computer 145 can validate the authenticity of a new data package, and can inform the second user computer 130 about the new interaction data in the data package.

The second node computer 145 can validate that a new data package is authentic in one or more manners. For example, the second node computer 145 can verify that the first node computer's digital signature and the administrative node computer's signature are both authentic (e.g., using their respective public keys).

In some embodiments, the second node computer 145 may only verify that the administrative node computer's signature is authentic, because the second node computer 145 may be affected by the administrative node's actions. For example, the first node computer's signature may only guarantee the first node's delivery of value to the administrative node, which may not directly affect the second node. In contrast, the administrative node computer's signature may guarantee the administrative node's delivery of value to the second node. Accordingly, the second node may only be concerned with the administrative node's actions and signature, and not the first node's action and signature.

In some embodiments, the second node computer 145 can verify the authenticity of an interaction and/or data package by accessing a central record (e.g., a blockchain record), and confirming that the interaction and/or data package has been added to the records.

The second node computer 145 is primarily described herein as a node that receives information about a new interaction (e.g., via a data package) on behalf of the second user computer 130. However, in some embodiments, the second node computer 145 can include some or all of the functionality described above with respect to the first node computer 165. For example, the second node computer 145 can submit data packages with new interaction data to the recording network on behalf of the second user computer 130 or other associated users. Similarly, in some embodiments, the first node computer 165 can include some or all of the functionality described with respect to the second node computer 145 (e.g., the first node computer 165 can receive and validate data packages on behalf of the first user computer 110).

Similar to the first node computer 165, the second node computer 145 can also be associated with a service provider computer such as a bank. As a result, the second node computer 145 can host a second user account, and can store and receive a value on behalf of the second user. As an example the second node computer 145 can be associated with an acquirer, which may typically be a business entity (e.g., a commercial bank) that has a business relationship with a particular resource provider or other entity. Some entities can perform both issuer and acquirer functions. Some embodiments may encompass such single entity issuer-acquirers.

In some embodiments, second node computer 145 may have a high-level of trust that a promised value will be delivered, for example because of two valid digital signatures, because the interaction data is included in a blockchain record, because the data package includes several associated identifiers (e.g., a class identifier and/or an address identifier), and/or because of any other suitable evidence. As a result, the second node computer 145 may make a value indicated in a received data package immediately usable (e.g., withdrawable) in the second user's account, even if the value has not yet been settled and received. Additionally, the second node may have a high-level of trust in the administrative node, as the administrative node may be a large, trusted central entity. As explained above, the second node may only need to trust the administrative node, since the second node may not be affected if the first node does not follow through. Accordingly, the administrative node's digital signature, even taken alone, may provide the second node with a high-level of trust.

As explained above, multiple nodes can join the recording network, and each node can send and receive data packages with interaction data on behalf of multiple users. A user can be an individual, a business, an organization's record-updating administrator, or any other suitable type of user. For example the first user can be an individual, and the second user can be a resource provider (e.g., a merchant) that engages in transactions and can sell goods or services, or provide access to goods or services.

In some embodiments, an end user can be associated with multiple enterprise identifiers. For example, a different enterprise identifier may be assigned to a user for each different currency and bank with which the user is associated. The first user can have multiple accounts at the first node computer 165, each with a different currency. Accordingly, the first user computer 110 can store a different enterprise identifier for each type of currency used with the first node computer 165. The first user may also engage in transactions using another account at a separate bank node, and may have another enterprise identifier associated with this additional bank.

Figure 4:
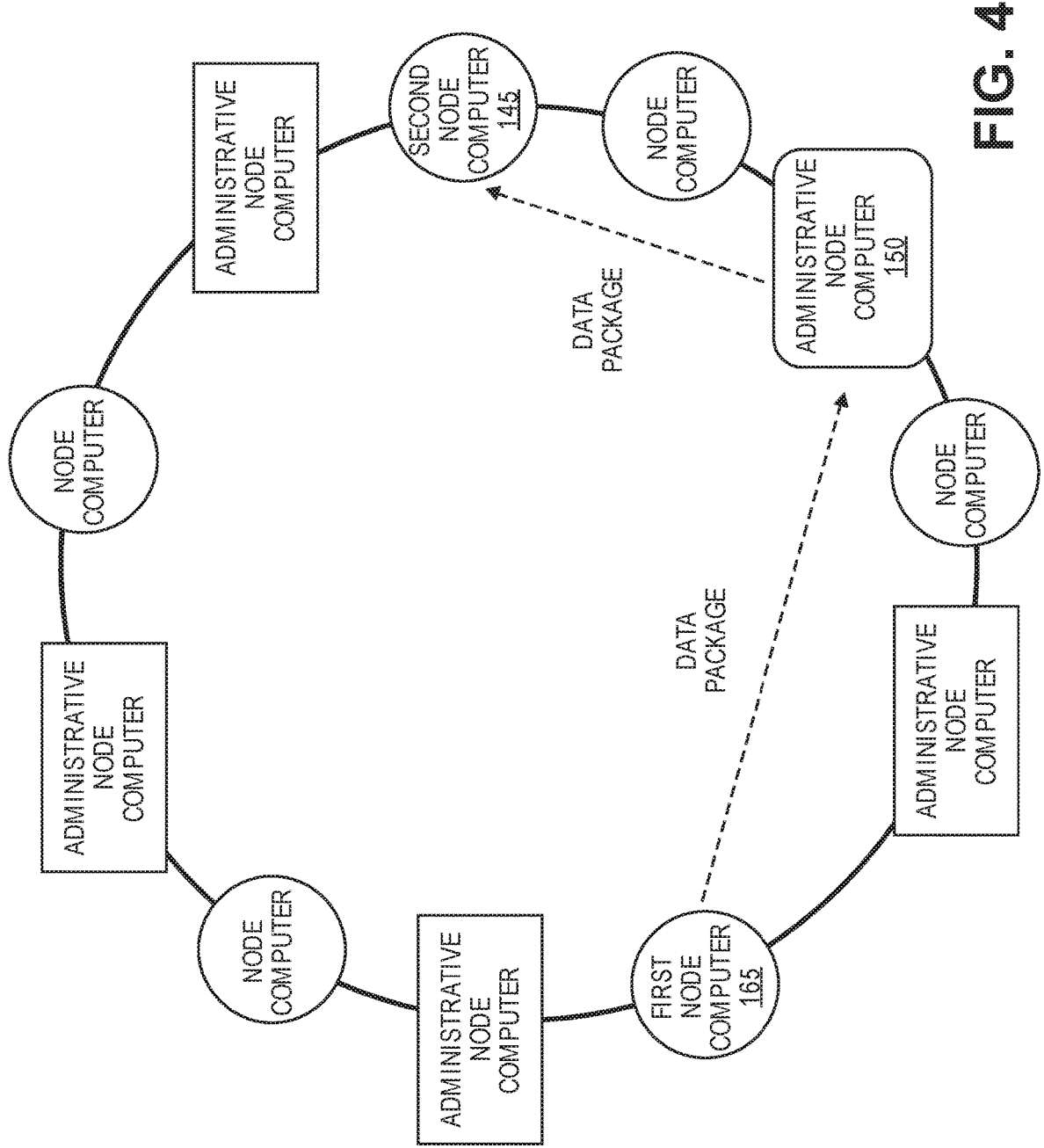
FIG. 4 shows an example of nodes in a network, according to an embodiment of the invention.

An example of a recording network is shown in FIG. 4. In some embodiments, as shown in FIG. 4, several nodes may be able to provide and receive data packages with interaction data within the recording network. An example transfer is shown, where an first node computer 165 is providing a data package with interaction data (e.g., for a payment transaction) to a second node computer 145. As shown, the first node computer 165 can send the data package to an administrative node computer 150, which can then forward the data package to the second node computer 145. The administrative node computer 150 can also validate and digitally sign the data package before sending to the second node computer 145. The recording network can include any other suitable number of node computers (e.g., which can act as senders and receivers), as well as additional administrative node computers. Each administrative node computer may maintain a ledger of interactions from data packages that have been transferred between the nodes, and the administrative node computers can update one another to maintain synchronized ledgers.

As mentioned above, in some embodiments, the recording system may utilize a blockchain. Each block in the blockchain may include information about one or more interactions (e.g., from one or more data packages). A blockchain ledger may be unalterable without detection. This ensures that any tampering of information related to transactions, such as an attempt to reassign a transaction value to an inappropriate entity, will not go unnoticed. Together, a block header and a block body that includes the transaction information (e.g., and any other suitable information) can make up a block.

As mentioned above, in some embodiments, a data package and a record entry can include information about a plurality of interactions. This can allow a single data package and record entry to include information about all the necessary steps for completing an event, such as a payment transaction or a project. For example, a construction project may involve several activities performed by several entities (e.g., plumbing by a plumber, electrical work by an electrician, etc.).

When creating a construction plan and obtaining commitment from each worker, it would be beneficial to have a single data package and record entry that describes each activity and reflects each worker's commitment, instead of having separately entered records for each activity and worker. In another example, a first node may not be able to send a payment directly to a second node (e.g., because they do not have a direct relationship). Instead, the payment may need to be broken into multiple constituent transactions (which can be referred to as atomic transactions), where an administrative node is used as an intermediary for facilitating transfer of the payment value. Again, it is more efficient to describe all of the atomic transactions together in a single data package, instead of recording each separately. An example of atomic transactions used, in combination, to transfer value from a sender to a receiver is shown in FIG. 5.

Figure 5:
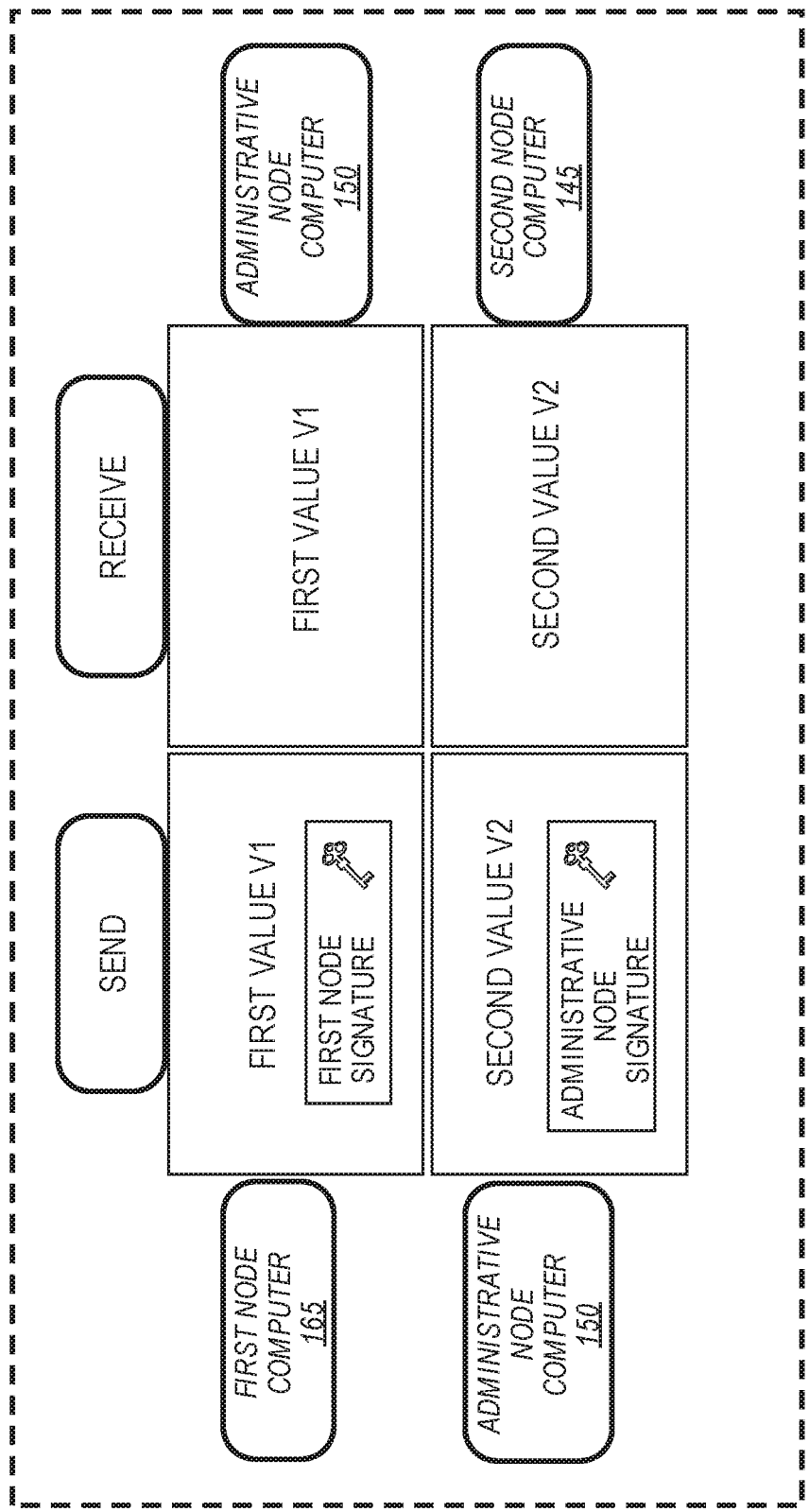
FIG. 5 shows an example of atomic transactions, according to an embodiment of the invention.

The example of atomic transactions in FIG. 5 shows a technique for transferring a value from a first node computer 165 to a second node computer 145, where the first node computer 165 and second node computer 145 do not necessarily have a direct relationship or a direct line of communication. The net value transfer is accomplished using two separate contributory transactions (referred to as atomic transactions). The first row represents the first atomic transaction. As shown in the first row, the first atomic transaction includes the first node computer 165 sending a first value V1, and the administrative node computer 150 receiving the first value V1. The second row represents the second transaction, in which the administrative node computer 150 sends a second value V2, and the second node computer 145 receives the second value V2. Through the combination of the atomic transactions, the first node computer 165 is effectively able to send the second value V2 to the second node computer 145. In some embodiments, the first value V1 and the second value V2 can be the same amount and/or same currency. In other embodiments, they can be different currencies, and an exchange fee can be assessed during conversion.

In order initiate sending a value to the second node computer 145, the first node computer 165 can generate data package. The data package can define both of the atomic transactions. For example, the data package can include the information about the different transactions shown in FIG. 5. In other words, the data package can specify which entity is responsible for sending each value, which entity is to receive each value, the amounts sent in each transaction, the type of currency (or other value class) used in each transaction, the specific accounts from which to draw and to which to deposit, and/or any other suitable information. The data package can also include information about possible exchange rates and/or fees (e.g., which can be withheld by the administrative node), both of which can be reflected in the difference between the first value V1 and the second value V2. The data package can be validated and recorded, and can serve as a promise of value. The actual transfer of value (e.g., settlement) can happen at a later time.

As shown in FIG. 5, the data package can be digitally signed by each entity responsible for an action defined in the data package. For example, as shown in the first row, the first node computer 165 can provide a digital signature for the data package, which can indicate the first node's commitment to sending the first value V1 to the administrative node computer 150. Also, as shown in the second row, the administrative node computer 150 can provide a second digital signature (e.g., if the administrative node computer 150 approves of the transactions), which can indicate the administrative node's commitment to sending the second value V2 to the second node computer 145. Once all of the actors (e.g., the first node computer 165 and the administrative node computer 150) have signed the data package, the data package (or the transactions defined in the data package) and associated digital signatures can be recorded in the ledger (e.g., posted to a blockchain), such that both of the transactions are recorded.

At a later time, each of the atomic transactions can be settled. For example, the first value V1 can be drawn from the first node's account and credited to the administrative node's account, and the second value V2 can be drawn from the administrative node's account and credited to the second node's account.

Because of the administrative node's commitment, the second settlement can be executed even if the first settlement fails.

As mentioned above, other types of interactions can also be recorded together in a single data package. For example, a general contractor can draw up plans for building a house. The general contractor can assign a task to each type of skilled worker (e.g., architect, plumber, electrician, roofer, woodworker, stonemason, etc.), and can define each task in a data package. Each worker can review the data package, and can agree to the defined task and terms by providing a digital signature. If all the workers have agreed and signed, the plans can be considered finalized because there are no objections. Accordingly, the completed data package can be stored in a record (e.g., a blockchain record) such that information representing the promised activities cannot be manipulated, and such that concerned parties can refer to the record and review what each worker has agreed to (and confirm that the total project will be completed when each task is finished).

Figure 6:
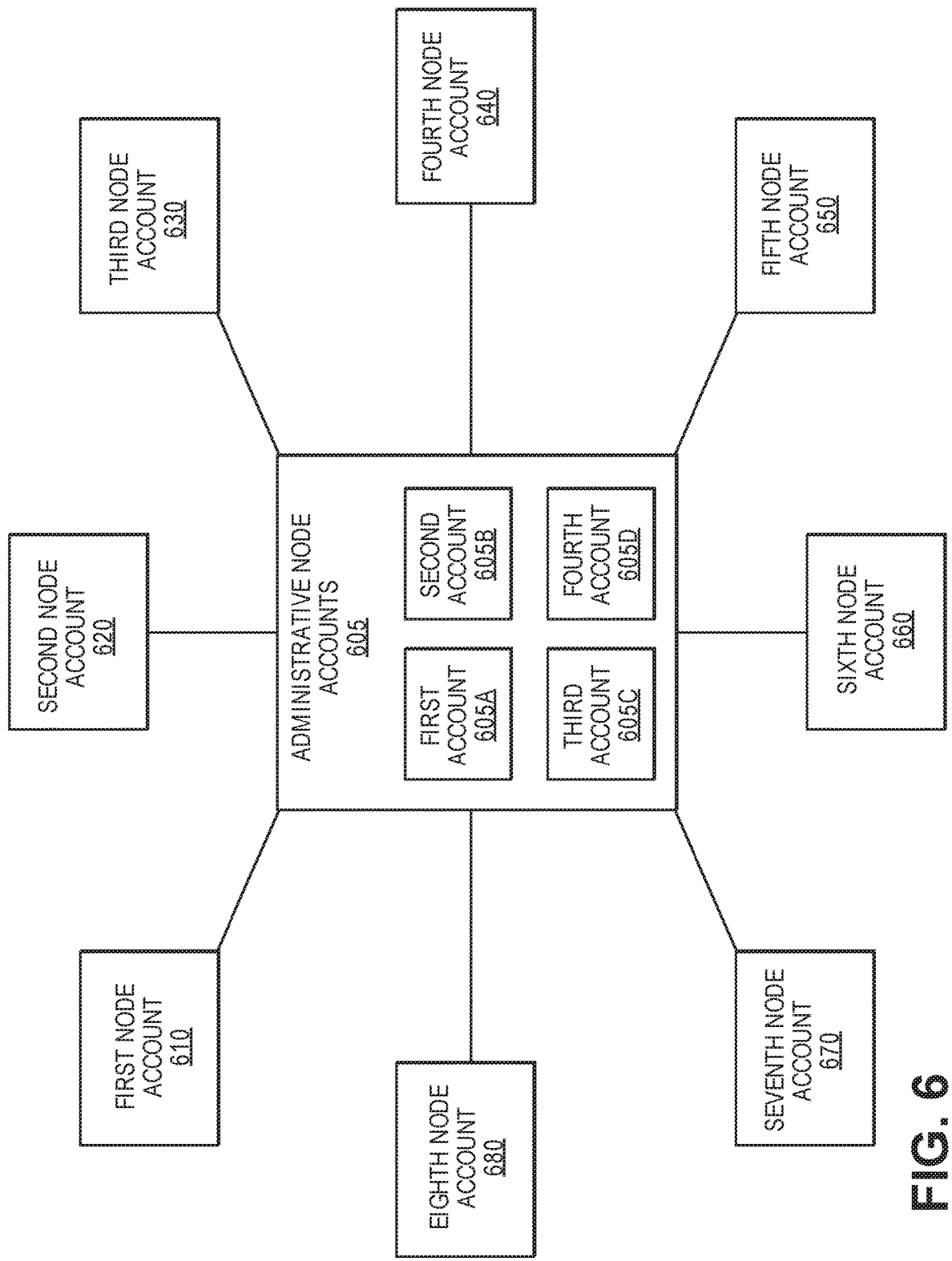
FIG. 6 shows a block diagram of account associations, according to an embodiment of the invention.

In the case of value transfers (e.g., payment transactions), settlement can take place in several manners. Some settlement techniques can be described with respect to FIG. 6, which shows a block diagram of settlement accounts. FIG. 6 shows several administrative node settlement accounts 605 including a first account 605A, a second account 605B, a third account 605C, and a fourth account 605D.

These can represent accounts for different types of currencies, accounts in different regions, or backup accounts. For example, the first account 605A may include currency in US Dollars and thus may be able to send and receive value using US Dollars, while the second account 605B may include Chinese Yuan and thus may be able to send and receive value using Chinese Yuan. Additional administrative node accounts 605 can also be included.

FIG. 6 also includes several settlement accounts associated with different nodes. For example, a first node account 610 can be associated with the first node computer 165, and the second node account 620 can be associated with the second node computer 145. The third node account 630, the fourth node account 640, the fifth node account 650, the sixth node account 660, the seventh node account 670, and the eighth node account 680 can each be associated with one or more additional node computers.

In some embodiments, all of the settlement accounts are funded and maintained at a central bank. The central bank can be associated with, in communication with, and/or operated by the administrative node. As a result, the administrative node computer 150 can control the settlement of transactions by communicating with the central bank. Other embodiments can instead utilize correspondent accounts (e.g., accounts established between different nodes without a central bank), as well as other alternative settlement arrangements.

FIG. 6 shows each of the node accounts connected to the central administrative node accounts 605 (e.g., like a hub with spokes). This demonstrates how the administrative node accounts 605 can serve as a common connection between the different node accounts.

For example, the first node may not have a direct relationship with the second node, but can transfer a value to the second node with the help of the administrative node and by utilizing atomic transactions. The central bank can cause the first node account 610 to be reduced by the first transaction value, and an administrative node account (e.g., the first account 605A) to be increased by the first transaction value. Then, the central bank can cause an administrative node account (e.g., the second account 605B) to be reduced by the second transaction value, and the second node account 620 to be increased by the second transaction value.

As a result, the administrative node accounts 605 enable a payment to be effectively transferred from the first node account 610 to the second node account 620. Additionally, the usage of multiple administrative accounts 605 enables the payment to be drawn from the first node account 610 in a first currency (e.g., because the administrative node's first account 605A can receive value in the first currency) and credited to the second node account 620 in a second currency (e.g., because the administrative node's second account 605B can send value in the second currency).

In some embodiments, the system can utilize net settlement practices. For example, at the end of the day, all of the transactions between the first node computer 165 and second node computer 145 can be combined to determine one net amount owed by the first node computer 165 to second node computer 145 (or vice versa). For example, the first node computer 165 may owe the second node computer 145 a net amount of ¥100,000. In the case of atomic transactions, this can actually mean determining a first net value (e.g., the net of all of the atomic transactions between the first node computer 165 and the administrative node computer 150) and a second net value (e.g., the net of all of the corresponding atomic transactions between the administrative node computer 150 and the second node computer 145). For example, the first node computer 165 may owe the administrative node computer 150 a net value of $17,000, and the administrative node computer 150 may owe the second node computer 145 a net value of 100,000. Once the net positions are determined, a single set of atomic settlement transactions can take place to transfer the net transaction values (e.g. a first settlement transaction between the first node account 610 the administrative node's first account 605A, and a second settlement transaction between the administrative node's second account 605B and the second node account 620).

This sort of net settlement transaction can take place between each of the nodes in the network. For example, a net settlement can also take place between the first node account 610 and the third node account 630, and a similar process can be repeated for transferring a net value from the first node account 610 to the third node account 630 (e.g., by utilizing an administrative node account and atomic settlement transactions).

In some embodiments, the system can utilize network-wide multilateral settlement practices in which the net positions are calculated between each node account and the rest of the network. For example, the first node account 610 may have a net negative position (e.g., owing $95,000) with respect to the second node account 620, a net positive position (e.g., due $27,000) with respect to the third node account 630, and a net positive position (e.g., due $43,000) with respect to the third node account 630. Instead of settling each of these positions separately, they can all be combined such that the a single total transfer (e.g., send $25,000) can take place between the first node account 610 and the administrative node's first account 605A. Similarly, a single total transfer can be used to settle the positions of the other node accounts.

In some embodiments, the central administrative node accounts 605 may not be needed for multilateral settlement of this sort. For example, instead of determining the network total position between each node account and the central administrator accounts 605, the net positions can be determined between all of the node accounts as a group (e.g., first node account 610 owes $25,000, second node account 620 due ¥13,000, third node account 630 owes $9,600, etc.), and then they can all be credited or debited at the same time according to their respective net positions (e.g., without using the administrative node accounts 605 as an intermediary step).

Figure 7A:
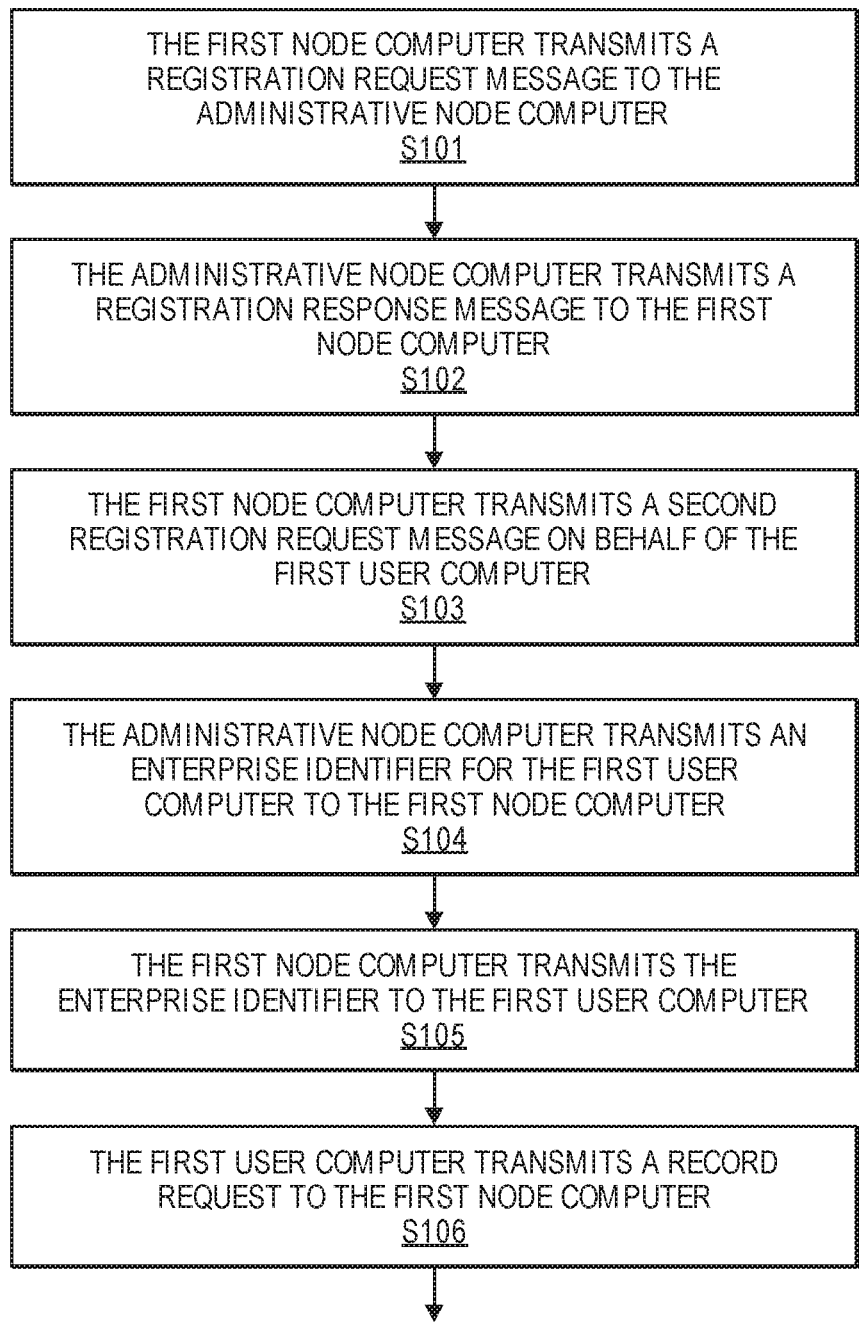
FIGS. 7A-7C shows a flow diagram illustrating a method for recording multiple interactions together at the same time, according to embodiments of the invention.
Figure 7B:
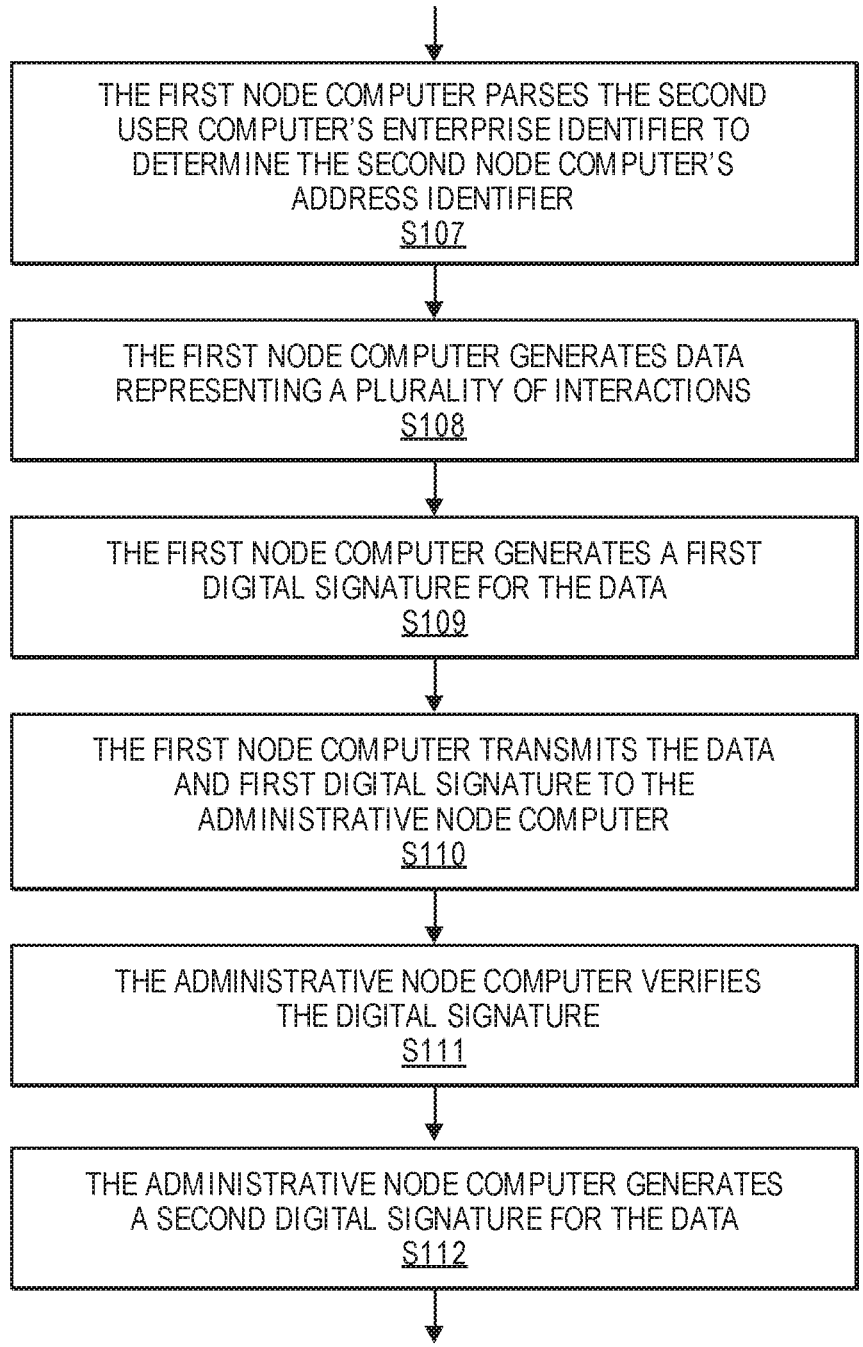
Figure 7C:
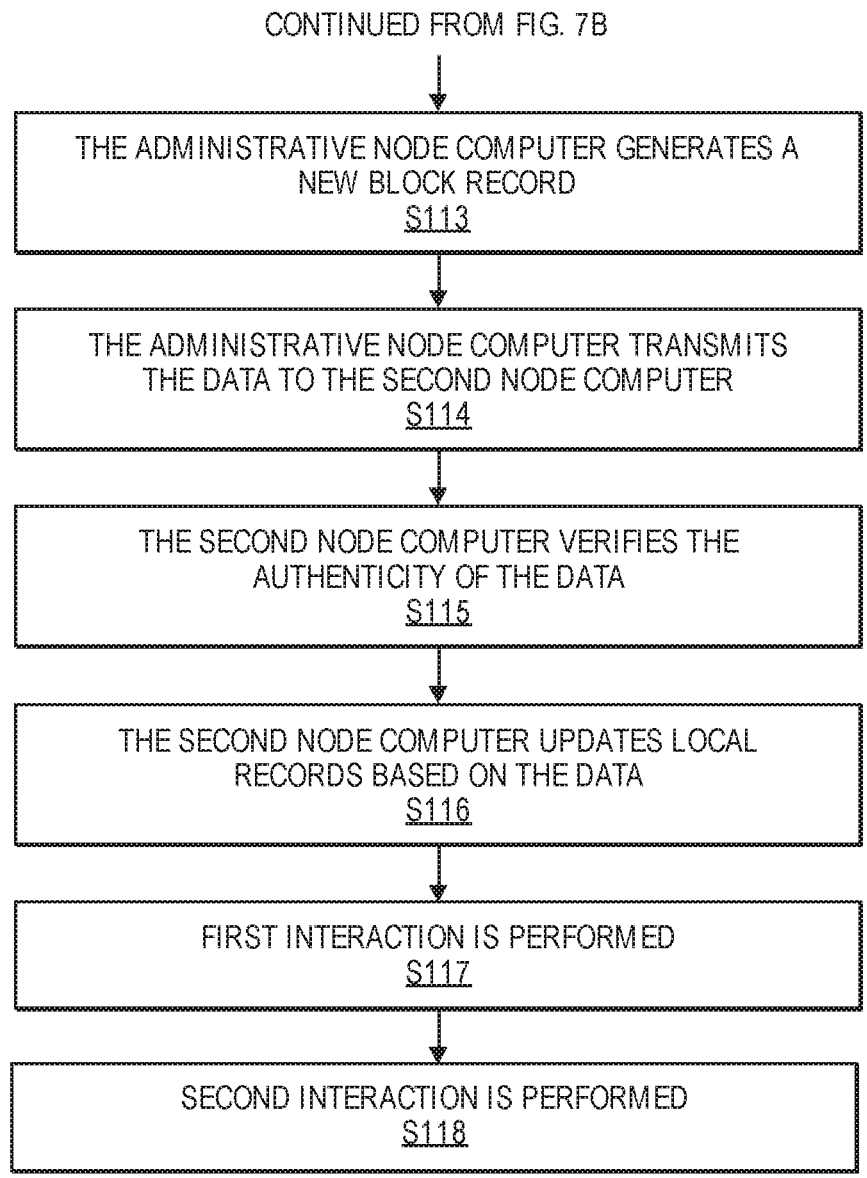

A method 700 according to embodiments of the invention can be described with respect to FIGS. 7A-7C. Some elements in other Figures are also referred to. The steps shown in the method 700 may be performed sequentially or in any suitable order in embodiments of the invention. In some embodiments, one or more of the steps may be optional.

The various messages described below may use any suitable form of communication. In some embodiments, a request or response may be in an electronic message format, such as an e-mail, a short messaging service (SMS) message, a multimedia messaging service (MMS) message, a hypertext transfer protocol (HTTP) request message, a transmission control protocol (TCP) packet, a web form submission. The request or response may be directed to any suitable location, such as an e-mail address, a telephone number, an internet protocol (IP) address, or a uniform resource locator (URL). In some embodiments, a request or response may comprise a mix of different message types, such as both email and SMS messages.

At step S101, the first node computer 165 transmits a registration request message to the administrative node computer 150. The registration request message may include information about the first node computer 165 (e.g., an address, an organization name, a bank identifier) and/or any other suitable information. The registration request can also request permission to act as a node and send and/or receive data packages with new interaction data, as well as request permission to create data packages with interaction data of a specific class.

At step S102, the administrative node computer 150 enrolls the first node computer 165 for participation in the recording network. The administrative node computer 150 can perform risk analysis to verify whether the first node computer 165 is sufficiently trustworthy to participate in the recording network. The administrative node computer 150 can then issue an address identifier for the first node computer 165, as well as issue one or more class identifiers.

The administrative node computer 150 may store information about the first node computer 165 (e.g., the address identifier, a bank name, etc.), and transmit a registration response message to the first node computer 165 indicating that the first node computer 165 is successfully enrolled. The response message can include the address identifier and/or the class identifiers.

At this point, the administrative node computer 150 may also provide any suitable software (e.g., a software development kit) to the first node computer 165 for interacting with the recording network.

At this point, or at any other suitable time, the first node computer 165 can also establish a settlement account at a central bank (e.g., a bank administered by the administrative node computer 150), or otherwise establish settlement agreements (e.g., using a correspondent bank that has a central settlement account). The first node computer 165 can indicate, in the registration request message, that a settlement account has been established for one or more currency types.

By registering with the administrative node computer 150 and establishing a settlement account, the first node computer 165 effectively creates a direct interaction relationship with the administrative node computer 150. The first node computer 165 and administrative node computer 150 can directly communicate, issue promises of payment to one another, transfer funds to one another using the settlement account, and can thereby trust one another.

The second node computer 145 can create a similar trust relationship by registering with the administrative node computer 150 and establishing a settlement account. As a result, the administrative node computer 150 can become a common contact between the first node computer 165 and the second node computer 145, such that the administrative node computer 150 can facilitate a transfer of value from the first node computer 165 to the second node computer 145 (e.g., using two atomic transaction steps) without the first node computer 165 and the second node computer 145 having a direct relationship or otherwise having trust in one another.

Additionally, having enrolled, the first node computer 165 can facilitate the enrollment of end users. The first user may desire to use the recording network, and may use the first user computer 110 to communicate a request for enrollment to the first node computer 165, as well as a type of currency that the first user would like to use for transactions.

At step S103, the first node computer 165 can transmit a second registration request message to the administrative node computer 150 on behalf of the first user. The first node computer 165 can provide any suitable information about the first user to the administrative node computer 150, such as a name, address, organization information, payment account information (e.g., a balance, and a currency type), a credit score, etc.

At step S104, the administrative node computer 150 can determine whether to enroll the first user (e.g., based on a risk profile). The administrative node computer 150 can also generate and issue an enterprise identifier for the first user computer 110.

In some embodiments, the enterprise identifier can only be used for a certain record class and for data packages submitted by the first node computer 165. Further, in some embodiments, a subset of the enterprise identifier (e.g., 5 characters) can be formatted to indicate an association with the first node computer 165 and/or a record class.

The administrative node computer 150 can transmit the first user computer's new enterprise identifier back to the first node computer 165. Then, at step S105, the first node computer 165 can store the enterprise identifier (e.g., as associated with the first user's account) and forward the enterprise identifier to the first user computer 110.

Having enrolled and obtained an enterprise identifier, the first user computer 110 can now initiate the recording of new interaction data. For example, if the enterprise identifier is associated with the use of currency, the first user computer 110 can now send payments to another user via the blockchain network.

At step S106, the first user computer 110 transmits a record request to the first node computer 165. For example, the first user computer 110 can submit a request for sending a payment to the second user computer 130. The record request can include the first user computer's enterprise identifier, the recipient's (e.g., the second user computer) enterprise identifier, and record update information for a specific record class.

In the payment transaction example, the record update information can comprise a type of currency to use as the payment source, a type of currency to deliver to the recipient, and an amount of currency to deliver to the recipient. For example, the first user may wish to send a payment of $1000 in Singapore dollars to the second user, but the first user may wish to make the payment from an account with US dollars.

At step S107, the first node computer 165 determines a node associated with the second user computer 130, such that a data package with the interaction data can be addressed to that node. For example, in some embodiments, the first node computer 165 can communicate with the administrative node computer 150 to inquire about what node and/or recipient are associated with the second user computer's enterprise identifier, as well as to validate the second user computer's enterprise identifier. In some embodiments, the first node computer 165 can use a locally stored lookup table for identifying a node associated with the second user computer's enterprise identifier. In other embodiments, the first node computer 165 can parse the second user computer's enterprise identifier to determine the second node computer's address identifier.

At step S108, the first node computer 165 generates data representing a plurality of interactions. The data can be formatted as a data package that can be entered into a record. The plurality of interactions can include a first interaction associated with the first node computer 165 (e.g., transmitting a first value from the first node to the administrative node) and a second interaction associated with the administrative node computer 150 (e.g., transmitting a second value from the administrative node computer to the second node computer). These two interactions can, in combination, accomplish the payment transfer requested by the first user computer 110.

As an example, the first node computer 165 can determine that, in order to send a payment of $1000 in Singapore dollars to the second user (or the second user's bank), two transactions are necessary. The first node computer 165 can also determine the amount of source funds needed to send the payment (e.g., based on an exchange rate and/or fees). The first transaction can be used to draw the source funds (e.g., $779 USD) from the first node's account and provide the funds to an administrative node account. The second transaction can be used to draw the delivery funds (e.g., $1000 SGD) from an administrative node account and provide the funds to the second node's account. Thus, the data package can include data representing a plurality of interactions designed to effectively transmit a value from the first node computer to the second node computer.

The data package can include any suitable information for describing the plurality of atomic transactions. For example, in addition to the accounts, amounts, currency types, etc. mentioned above, the data package can also include the first user computer's enterprise identifier, the second user computer's enterprise identifier, the first node computer's address identifier and/or class identifier, the second node computer's address identifier and/or class identifier, and/or any other suitable information.

At step S109, the first node computer 165 generates a first digital signature associated with the data representing the plurality of interactions. For example, the first node computer 165 can generate a one-way hash using some or all of the information in the data package, and then encrypt the hash using a private key (e.g., a first private key associated with the first node computer 165). The hash data value and/or digital signature may be attached to the data package, thereby making the data package data-tampering evident. The presence of the first digital signature can indicate that the first node computer 165 agrees with the information in the data package (e.g., the first interaction). Since the data package can include information about a first payment to be sent by the first node computer 165, the first digital signature can indicate that the first node computer 165 has committed to providing the first payment (or otherwise guaranteeing that the payment will be provided).

At step S110, the first node computer 165 transmits the data representing a plurality of interactions and the first digital signature to the administrative node computer 150 for validation and entering into a blockchain record.

At step S111, the administrative node computer 150 can verify the first node computer's digital signature and/or hash value. For example, the administrative node computer 150 may perform a checksum procedure for the hash value. This can include generating a second hash value based on the data package and checking that the second hash value matches the received hash value. The administrative node computer 150 may verify the digital signature using the first node computer's public key. The administrative node computer 150 can reject the data package if the hash or digital signature cannot be verified.

The administrative node computer 150 can also verify that the first node computer's class identifier and address identifier are all valid and both associated with the first node computer 165. The administrative node computer 150 can additionally verify that the class identifiers are being used appropriately. For example, if the data package includes interaction data for sending a value from an account with US dollars, the administrative node computer 150 can verify that the first node computer's class identifier is also associated with the use of US dollars.

If step S111 as well as any other suitable verification steps are successfully completed, the administrative node computer 150 can consider the data package valid, and can be confident that the first node computer 165 will follow-through with the promised first payment.

At step S112, the administrative node computer 150 generates a second digital signature for the data package (e.g., using a second private key associated with the administrative node computer 150). The presence of the second digital signature can indicate that the administrative node computer 150 agrees with the information in the data package (e.g., the second interaction). Since the data package can include information about a second payment to be sent by the administrative node computer 150, the second digital signature can indicate that the administrative node computer 150 has committed to providing the second payment (or otherwise guaranteeing that the second payment will be provided). In some embodiments, the second digital signature can indicate that the second value will be transmitted even if the first value is not transmitted (e.g., because the first node computer 165 fails to deliver the first value).

At step S113, the administrative node computer 150 can add information about the interactions (and/or the entire data package) to a record. For example, the administrative node computer 150 can create a new block for a blockchain, the block including the data representing the plurality of interactions (e.g., along with one or more other new data packages) as well as the digital signatures. Thus, a single record entry can be used to record multiple related transactions. Additionally, a single entry into a blockchain ledger can show that two (or more) different entities have committed to two (or more) different interactions.

The data package and record entry can also include information explaining that the different atomic transactions are designed to achieve, in combination, a certain result.

At step S114, the administrative node computer 150 can transmit a copy of the data package to the second node computer 145 (e.g., to inform the second node computer 145 about the transactions). The administrative node computer 150 can also make the blockchain record accessible to the second node computer 145.

At step S115, the second node computer 145 can verify the authenticity of the data package. For example, the second node computer 145 can confirm that the data package has been entered into the blockchain record (e.g., by accessing the blockchain record at the administrative node computer 150). The second node computer 145 can also verify that data package includes two digital signatures; one from the first node computer 165, and one from the administrative node computer 150. The second node computer 145 may also check that the administrative node computer 150 (or other trusted entity) is the one responsible for providing the final value to the second node computer 145, and that the administrative node computer 150 has specifically agreed to delivering the final value (e.g., via a digital signature). The second node computer 145 can also verify the digital signatures (e.g., using the appropriate public keys). All of these verifications, in combination, can create a high-level of trust in the authenticity of the data package, as well as a high-level of trust that a promised interaction will be completed (e.g., even if a problem arises with the first node computer 165).

At step S116, the second node computer 145 can update its local records based on the data package. For example, the second node computer 145 can credit the promised transaction value (e.g., as indicated in the data package) to the second user's bank account. Because there may be a high-level of trust in the interaction, the second node computer 145 may credit the second user's account so that the funds can be withdrawn before the transaction value is actually settled the administrative node account and the second node account.

At a later time, steps can be taken to settle the transaction values indicated in the data package. The administrative node computer 150 may send instructions (e.g., the data package) to a central bank, such that the central bank can execute settlement (e.g., as described above with respect to FIG. 6). In some embodiments, a central bank computer can access a record (e.g., a blockchain ledger) maintained by the administrative node computer 150, can analyze the record to determine what settlement transactions to complete. A central bank computer can review the instructions and/or data package to determine the two (or more) scheduled payment transactions that are to be completed.

At step S117, the first interaction can be performed. For example, the central bank computer can cause a transfer of funds to take place as specified by the first transaction in the data package. This can include debiting the first value from the first node's settlement account, and then crediting the same first value to an administrative node settlement account.

At step S118, the second interaction can be performed. For example, the central bank computer can cause a transfer of funds to take place as specified by the second transaction in the data package. This can include debiting the second value from an administrative node settlement account, and then crediting the same second value to an second node's settlement account. As explained above, the second value can have a different amount and/or currency type than the first value, Accordingly, while the interactions (e.g., payments) are promised and agreed to by the first node computer 165 and the administrative node computer 150, the actual transfer activities may be performed by a central bank computer (or other suitable entity).

As explained above with respect to FIG. 6, embodiments additionally allow batch settlement to take place (e.g., at the end of the day) for multiple transactions associated with multiple data packages. Additionally, multilateral settlement can be performed where net positions are calculated between each node and the rest of the network, such that separate settlements are not needed for every node-to-node pair.

Embodiments of the invention have a number of advantages. For example, in embodiments of the invention, multiple interactions can be defined using a single data package. Instead of recording a set of interactions separately such that the recording process is repeated for each interaction, multiple interactions can be defined, processed, and recorded together. For example, a data package can be created to include information about several interactions (e.g., instead of one interaction), and the data package can be passed to each acting entity such that it can be reviewed, approved, and/or digitally signed by each acting entity (e.g., instead of one entity) before being recorded. As a result, the work for recording a set of interactions is consolidated and reduced, the efficiency of recording the interactions is improved, and the bandwidth used when processing a group of interactions is reduced.

Additionally, a set of related interactions can be recorded as a bundle, such that related data can be grouped together. This improves the organization and accessibility of the total record. For example, in the example of a construction project, a single data package can be created that represents the entire project, and the data package can include information about multiple tasks needed to complete the project. Each actor can review and approve of (e.g., digitally sign) the data package, and then the data package and associated digital signatures can be entered into a blockchain record. As a result, all of the tasks of the construction project can be found by locating a single data package in the blockchain record. This makes it easy to review each of the tasks, to verify that all necessary tasks have been assigned for completing the project, and to verify that each actor has committed to completing their assigned tasks (e.g., by checking for their digital signatures).

Embodiments of the invention also advantageously increase the trustworthiness of a blockchain ledger. A central, trusted administrator can enroll each node and end user, track participant behavior (e.g., monitor for unusual activity), and make sure that participants do not exceed spending limits. Additionally, each data package can be digitally signed by both the submitting node and the administrative node, and the administrative node can enter a new data package into a secure blockchain. As a result, receiving nodes can be sure that a number of safety checks have been completed, that the data package will not be erased or changed, and that the data package is therefore legitimate and trustworthy.

Further, in the example where the record entry includes a promise of payment, a receiving node can be confident that a promised value will be delivered for a number of reasons. For example, the payment transaction can be separated into two atomic transactions, and the final delivery of value to the receiving account can be the responsibility of the administrative node. The receiving node can have a direct relationship with and high-level of trust in the administrative node (e.g., as opposed to a potentially unknown sending node), and can therefore trust that the administrative node will follow through with the final payment even if the original sending node does not follow through with the first payment step.

A computer system will now be described that may be used to implement any of the entities or components described herein. Subsystems in the computer system are interconnected via a system bus. Additional subsystems include a printer, a keyboard, a fixed disk, and a monitor which can be coupled to a display adapter. Peripherals and input/output (I/O) devices, which can couple to an I/O controller, can be connected to the computer system by any number of means known in the art, such as a serial port. For example, a serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method comprising:
receiving, by an administrative node computer, a data package which defines a plurality of interactions, from a first node computer, the plurality of interactions including a first interaction associated with the first node computer and a second interaction associated with the administrative node computer, wherein the first interaction includes transmitting a first value from the first node computer to the administrative node computer;
receiving, by the administrative node computer, a first digital signature associated with the data package, the first digital signature being generated with a first private key associated with the first node computer, and the first digital signature indicating the first node computer's agreement with the first interaction;
generating, by the administrative node computer, a second digital signature with a second private key associated with the administrative node computer, the second digital signature indicating the administrative node computer's agreement with the second interaction, where the second interaction includes transmitting a second value from the administrative node computer to a second node computer, and where the plurality of interactions are designed to, in combination, transmit the second value from the first node computer to the second node computer; and
creating, by the administrative node computer, a block for a blockchain, the block including the data package.

2. The method of claim 1, further comprising:
verifying, by the administrative node computer, the first digital signature using a first public key associated with the first node computer.

3. The method of claim 1, wherein the first value is the same as the second value.

4. The method of claim 3, wherein the second digital signature indicates that the second value will be transmitted even if the first value is not transmitted.

5. The method of claim 1, wherein the data package data representing the plurality of interactions was generated by the first node computer.

6. The method of claim 1, further comprises:
transmitting, by the administrative node computer, the data package to the second node computer.

7. The method of claim 1, wherein the data package includes an address of the administrative node computer and an address of the second node computer.

8. The method of claim 1, further comprising:
receiving, by the administrative node computer, a registration request message.

9. The method of claim 1, further comprising:
transmitting, by the administrative node computer, an enterprise identifier to the first node computer.

10. The method of claim 1, wherein the first digital signature activates a first contract associated with the first interaction, and wherein the second digital signature activates a second smart contract associated with the second interaction.

11. A method comprising:
generating, by a first node computer, a data package which defines a plurality of interactions, the plurality of interactions including a first interaction associated with the first node computer and a second interaction associated with an administrative node computer, where the first interaction includes transmitting a first value from the first node computer to the administrative node computer, the second interaction includes transmitting a second value from the administrative node computer to a second node computer, and the plurality of interactions are designed to, in combination, transmit the second value from the first node computer to the second node computer;
generating, by the first node computer with a first private key, a first digital signature associated with the data package, the first digital signature indicating the first node computer's agreement with the first interaction; and
transmitting, by the first node computer, the data package and the first digital signature to the administrative node computer, wherein the administrative node computer generates a second digital signature with a second private key, the second digital signature indicating the administrative node computer's agreement with the second interaction, and wherein the administrative node computer creates a block for a blockchain, the block including the data package.

12. The method of claim 11, where the data package is a first data package, the plurality of interactions is a first plurality of interactions, and the block further includes a second data package that defines a second plurality of interactions different than the first plurality of interactions.

13. The method of claim 11, wherein the first interaction is a first payment, and wherein the second interaction is a second payment.

14. The method of claim 13, wherein the first value it a first amount in a first currency, wherein the second value is a second amount in a second currency different from the first currency.

15. The method of claim 13, wherein the first value it a first amount of the first payment, wherein the second value is a second amount of the second payment, where the second amount is less than the first amount, and wherein the data package further includes information about exchange rates or fees that are deducted from the first amount.

16. An administrative node computer comprising:
a processor; and
a computer readable medium, the computer readable medium comprising code, executable by the processor, for implementing a method comprising:
receiving a data package which defines a plurality of interactions, from a first node computer, the plurality of interactions including a first interaction associated with the first node computer and a second interaction associated with the administrative node computer, wherein the first interaction includes transmitting a first value from the first node computer to the administrative node computer;
receiving a first digital signature associated with the data package, the first digital signature being generated with a first private key associated with the first node computer, and the first digital signature indicating the first node computer's agreement with the first interaction;
generating a second digital signature with a second private key associated with the administrative node computer, the second digital signature indicating the administrative node computer's agreement with the second interaction, where the second interaction includes transmitting a second value from the administrative node computer to a second node computer, and where the plurality of interactions are designed to, in combination, transmit the second value from the first node computer to the second node computer; and
creating a block for a blockchain, the block including the data package.

17. The administrative node computer of claim 16, further comprising:
verifying the first digital signature using a first public key associated with the first node computer.

18. The administrative node computer of claim 16, wherein the block further includes the first digital signature and the second digital signature.

19. The administrative node computer of claim 18, wherein the second digital signature indicates that the second value will be transmitted even if the first value is not transmitted.

20. The administrative node computer of claim 16, wherein the data package was generated by the first node computer.

* * * * *

UNITED STATES PATENT AND TRADEMARK OFFICE
CERTIFICATE OF CORRECTION

PATENT NO. : 11,429,592 B2
APPLICATION NO. : 16/604950
DATED : August 30, 2022
INVENTOR(S) : Ajith Thekadath et al.

It is certified that error appears in the above-identified patent and that said Letters Patent is hereby corrected as shown below:

In the Claims

Column 26, Line 25, delete "data representing the plurality of interactions"

Signed and Sealed this
Twentieth Day of December, 2022

Katherine Kelly Vidal
*Director of the United States Patent and Trademark Office*